United States Patent Office 3,451,974
Patented June 24, 1969

3,451,974
PROCESS FOR MOISTURE CONDITIONING OF NYLON
George E. Munn, Wilmington, Del., assignor to E. I. du Pont de Nemours and Company, Wilmington, Del., a corporation of Delaware
No Drawing. Filed Dec. 1, 1965, Ser. No. 510,971
Int. Cl. C08g 53/20, 20/00
U.S. Cl. 260—78
5 Claims

ABSTRACT OF THE DISCLOSURE

Conditioning nylon to equilibrium moisture content by contacting nylon with water at about 100° C. for 5 to 25% of the time necessary to reach equilibrium moisture content at 100° C. and subsequently contacting said nylon with atmospheric steam at a preselected temperature for about 5 to 25% of the time necessary to reach equilibrium moisture content.

---

This invention comprises a process for rapidly conditioning nylon to approximate equilibrium moisture content without employing high pressures.

Conditioning nylon to equilibrium moisture to increase its toughness and minimize dimensional change under conditions of use is a well known practice. Previous methods for conditioning nylon to equilibrium can be divided into two general procedures (1) exposing the polymer to steam heated to about 120° C. at one atmosphere, or (2) immersing nylon in an aqueous solution of potassium acetate that boils at 120° C. The time required to reach equilibrium can be shortened somewhat by the use of superheated steam at higher temperatures. However, attaining equilibrium following these procedures is very lengthy, particularly for relatively thick objects. The above methods are all well known in the art but these procedures have not been entirely satisfactory primarily because the time of treatment is inordinately long and/or high pressures must be employed, thus requiring expensive equipment. Furthermore, procedural steps must be taken for air removal because it is known that nylon oxidizes in air at advanced temperatures with the consequent loss of valuable properties.

It has now been discovered that nylon can be conditioned rapidly to obtain an approximate equilibrium moisture content at a predetermined relative humidity. The method comprises contacting nylon with $H_2O$, in the liquid or vapor state, at about 100° C. for about 5 to 25%, preferably 10 to 15%, of the time necessary to reach equilibrium moisture content at about 100° C. and, subsequently contacting said nylon with atmospheric steam, at a temperature at which said steam at atmospheric pressure will give a predetermined relative humidity, for about 5 to 25% of the time necessary to reach equilibrium moisture content at such temperature from a dry state.

The absorption of water by nylon is measured by weight increase. A correction is made for the loss of weight caused by extraction of water-soluble materials by drying the conditioned nylon and reweighing. The total water absorption is then the sum of the weight increase when weighed water wet and the weight loss of the dry extracted nylon. The time necessary to reach equilibrium moisture content can be calculated simply by using Fick's second law of diffusion which is:

$$\frac{Q}{Q_e} = K \frac{\sqrt{t}}{l}$$

wherein $Q$=weight change at time $t$
$Q_e$=weight change at equilibrium
$K$=proportionality constant
$l$=thickness, and
$t$=time The procedure involves taking two identical samples of nylon, e.g., polycaprolactam, that are to be treated according to the process of this invention and determining the time necessary to reach moisture equilibrium for each under a different set of conditions. One sample is heated in 100° C. $H_2O$, either vapor or liquid, and the other sample is heated with steam at a temperature which will provide a predetermined or preselected relative humidity, e.g., for 50% relative humidity 120° C. at one atmosphere. In each case the $\sqrt{t}/l$ is plotted against the changing weight for each sample until the weight change becomes zero, thus indicating that equilibrium has been reached. Then knowing the thickness of the bar, the time necessary for equilibrium can be calculated under each set of conditions. The value for $\sqrt{t}/l$ depends on the composition of the sample such as the percent of base present, the percent or filler in the nylon, the cocatalyst used and the density of the nylon. Therefore, for the above reasons, for each new nylon sample the time will vary and; therefore, it is necessary to determine by routine experimentation, as described above, the time required to reach equilibrium.

The second variable, the temperature of the atmospheric steam, is determined by the following method using the formula:

$$\frac{14.7 \text{ (pressure of saturated steam at one atmosphere)}}{\dfrac{\text{percent predetermined relative humidity}}{100}} =$$

pressure of saturated steam

The temperature to which the steam is heated is then found by referring to the saturated steam tables found, for example, in "Handbook of Chemistry", Lange, 8th ed. page 1510 et seq. (1952) and locating the temperature corresponding to the pressure as determined above.

Any nylon may be conditioned following the process of this invention. Accordingly, the term nylon, as used in this application means a polyamide i.e., polycarbonamide, containing repeating units of the type

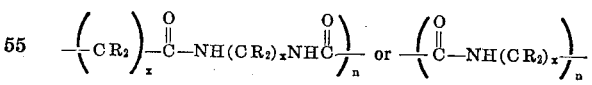

where R is hydrogen, alkyl, aryl, substituted alkyl, substituted aryl, alicyclic or substituted alicyclic, $x$ is the number of $CR_2$ groups between functional groups in the monomer, and $n$ is the degree of polymerization of the nylon. Nylons suitable for use in the instant invention, include for example, 6/6-nylon; 6/10-nylon; 6-nylon, made either by conventional water catalyzed polymerization or by promoted anionically catalyzed polymerization; 11-nylon; 13/13-nylon; 12-nylon and 8-nylon.

The invention will now be described in terms of a preferred embodiment wherein poly-ε-caprolactam, i.e., 6-nylon, made by promoted anionic polymerization of ε-caprolactam, either alone or mixed with minor proportions, from about 5 to 25 mole percent, of other lactams, is conditioned to moisture equilibrium.

The polycaprolactam that is treated was made by an anionic polymerization process conducted below the melting point of the resultant polymer. ε-Caprolactam was mixed with a base and heated in order to form the lactam-base salt, which acts as the catalyst in the polymerization reaction. A co-catalyst, or polymerization promoter, is added to the polymerization mixture with or without the addition of a blowing agent. The polmerization mixture is heated above the melting point of the monomer but below the melting point of the resultant polymer and a solid product is obtained.

Suitable bases include alkali and alkaline earth metals such as lithium, sodium and potassium, either in metallic form or in the form of hydrides, oxides, hydroxides, carbonates, etc.; organo-metallic derivatives of the foregoing metals, as well as other metals.

The anionic catalyst, or lactam-base salt, is prepared by heating the lactam with a base at a temperature between about 25 and 215° C. and above the melting point of the lactam. The base can be added to the total lactam which is to be polymerized or to a portion of the lactam which is to be polymerized and this portion of the lactam containing the anionic catalyst added to more of the lactam later. The time required for this step depends upon the strength of the base employed, the proportion added, and the temperature chosen and can be from a few seconds to several hours. Preferably, the lactam should be substantially anhydrous as should the added base. Generally, the amount of base charged should be about from 0.1 to 10 mole percent based on the total lactam used in preparing the anionic catalyst and the subsequent polymerization.

Any cocatalysts, or polymerization promoters, capable of polymerizing caprolactam can be employed. These cocatalysts are usually derived from organic and inorganic acids of particular types. Some effective cocatalysts include acylating agents and acyl compounds, for example, acyl halides, anhydrides, imides, organic isocyanates, ketenes and substituted ureas. Specifically desirable are N-substituted imides having the structural formula

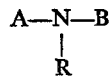

wherein A is an acyl radical such as carbonyl, thiocarbonyl, sulfonyl, phosphinyl, and thiophosphinyl radicals, B is an acyl radical of the group A and nitroso, R is a radical such as A, hydrocarbyl, imino and heterocyclic radicals and derivatives thereof, wherein said radicals in turn can contain radicals such as carbonyl, thiocarbonyl, sulfonyl, nitroso, phosphinyl, thiophosphinyl, tert-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto. Other cocatalysts such as carbonate esters having at least one carbocyclic aromatic ring attached to the carbonate described in U.S. Patent 3,207,713 are suitable. Still other desirable cocatalysts are described in U.S. Patents 3,214,415 and 3,206,418.

The cocatalyst is added in amounts varying from about 0.05 to about 5 mole percent based on the total lactam. It can be added to the lactam containing the anionic catalyst or dissolved in a separate portion of the lactam and the two portions of lactam mixed at about the time the polymerization is desired.

When foamed polylactam articles are desired a foaming agent is added prior to, or at the time of, polymerization. The molten lactam containing catalyst and cocatalyst, for example, can be whipped into a froth by sparging with an inert gas and polymerized while in this condition. Alternatively, a blowing agent can be introduced into the lactam containing catalyst and cocatalyst at polymerization temperature. The blowing agent can be chosen from either of two groups of chemicals. The first group comprises thermally stable gases, liquids, and solids which are soluble in and compatible with the constituents of the catalyzed caprolactam composition at the mixing temperature, which do not interfere with the polymerization of caprolactam, and which subsequently are disengaged from the caprolactam composition in gaseous form during the polymerization. Materials in this group of blowing agents include benzene, cyclohexane, trioxane, hexane, heptane, hexene-1, n-octane, propane and the like. These materials which are chemically inert in the reaction system and have suitable solubility and volatility may be used in amounts from 1% to 15% by weight, preferably 2–10%.

Alternatively, a chemical blowing agent may be used. This agent is soluble or is dispersed in finely divided form in the caprolactam mixture, is compatible with it at working temperatures, and does not materially interfere with the polymerization of the caprolactam. The chemical blowing agent may be incorporated in one stream of the ε-caprolactam composition together with cocatalyst and subsequently the composition after mixing with the other stream is foamed during polymerization; or the blowing agent may be added as a separate stream during the mixing of the two streams. Certain azo compounds such as α,α-azidobis(isobutyronitrile) and α,α-azobis(cyclohexanecarbonitrile) are effective chemical blowing agents. Among the preferred blowing agents are those disclosed in patent application Ser. No. 171,356, filed Feb. 6, 1962.

EXAMPLES

Polycaprolactam is made by the following technique in the form of bars having the dimensions given hereinafter.

Formulation A

Two portions of molten ε-caprolactam (102 parts each) are prepared under anhydrous conditions in an atmosphere of nitrogen. To one portion 0.48 part (2.0 mole percent) of sodium hydride is added and it is heated at 150° C. while sparging with nitrogen for 15 minutes. To the other portion of molten caprolactam 0.77 part (0.4 mole percent) of 1-dimethylamino-4,6-dichloro-s-triazine is added and it is heated to 150° C. and sparged with nitrogen for 15 minutes. The two portions are mixed, poured into molds of the proper size, and held at 150° C. for 15 minutes, then cooled.

Formulation B

Bars are made in the same way as in Example 1 with the exception that 1.0 mole percent of NaH is used and 0.2 mole percent of 2,4-tolylenediisocyanate is the cocatalyst.

Formulation C

A foamed formulation containing filler is made by a variation of the technque of Example 1. Dry, finely divided $CaCO_3$ 4.0 wt. percent based on ε-caprolactam and potassium stearate, 3.0 wt. percent, are added to the cocatalyst stream employing the cocatalyst 1-dimethylamino-4,6-dichloro-s-triazine (0.5 mole percent). The catalyst stream contains 2.5 mole percent of sodium caprolactam. The two streams are mixed and the blowing agent dodecenyl azide is added. Samples of two different densities are made. For a density of 0.70, Formulation C-1, 0.42 wt. percent is added; and for a density of 0.95, Formulation C-2, 0.10 wt. percent is added. After the blowing agent is added the streams are thoroughly mixed and poured into molds at 150° C. for 15 minutes, then cooled.

Formulation D

The procedure of Formulation C is repeated with the exception that the potassium stearate is reduced to 0.5 wt. percent, no blowing agent is added and 25 wt. percent of finely divided $CaCO_3$ ("Non Fer Al") is added to each stream before mixing.

The equilibrium moisture content of each polycaprolactum sample is determined by heating a sample of each formulation in boiling water, and a different sample, or the same, in 120° C. stream at atmospheric pressure until the weight remains constant.

These values are listed as follows:

2.4 grams of water per 100 grams of polycaprolactam, which is approximately the calculated equilibrium moisture content for this formulation as shown in the table hereinabove. Furthermore, from the table it can be seen that by following a conventional procedure the equilibrium moisture content at 50% relative humidity is obtained after 34 hours of treatment.

Another nylon bar was conditioned in the same manner but to 75% relative humidity employing 108° C. steam.

Example 3

A polycaprolactam foamed bar ¼″ thick, made according to formulation C-1 above, is heated in boiling water for ½ hour, or 12% of the time necessary to reach equilibrium, and subsequently placed in a chamber containing steam at 120° C. (50% R.H.) and at atmospheric pressure for ½ hour, or 12% of the time necessary to reach equilibrium. The polycaprolactam sample is re-

| | Equilibrium moisture content (g./100 g.) at room temperature (50% R.H.) | Density, g./cc. | Equilibrium moisture content (g./100 g.) at— | | $\sqrt{t}/1$ | | t (hours) for ⅛″ bar | |
|---|---|---|---|---|---|---|---|---|
| | | | 100° C. (100% R.H.) | 120° C. (50% R.H.) | 100° C. | 120° C. | 100° C. | 120° C. |
| Formulation A | 3 | (x) (x) | 14 | 3 | 23 | 23 | 8 | 8 |
| Formulation B | 2.6 | (x) (x) | 10 | 2.4 | 33 | 33 | 17 | 17 |
| Formulation C-1 [1] | | 0.70 | 18.8 | 2.2 | 13 | 13 | 2.64 | 2.64 |
| Formulation C-2 [1] | | 0.95 | 16.5 | 2.1 | 20 | 20 | 6.25 | 6.25 |
| Formulation D [1] | | (x) (x) 25% $CaCO_3$ | 14 | 5.6 | 18 | 29 | 5.05 | 13.1 |
| Commercial 6/6-nylon | 2.5 | (x) (x) | 9 | | 36 | 36 | 20 | 20 |

[1] Equilibrium moisture contents are essentially independent of temperature.
(x) (x) Density given only for foamed samples.

The following examples illustrate conditioning polycaprolactam to an equilibrium moisture content at a predetermined relative humidity (R.H.) of 50%, thus requiring 120° C. steam in the second step, 25% R.H. with 144° C. steam and 75% R.H. with 108° C. steam. Nylon for most purposes is usually conditioned to an equilibrium moisture content at a relative humidity of about 50%. However, any predetermined relative humidity can be established in the nylon following the teachings of this invention. In general, for practical purposes the equilibrium moisture content established in nylon is less than about 80%.

Example 1

A polycaprolactam bar ⅛″ thick, made according to Formulation A above, is heated in boiling water for 0.5 hour, or 6.2% of the time necessary to reach equilibrium, and subsequently placing the bar in a chamber containing steam at 120° C. (50 R.H.) and at atmospheric pressure for one hour, or 12% of the time necessary to reach equilibrium. The polycaprolactam sample is removed. This formulation of polycaprolactam is found to contain about 3 grams of water per 100 grams of polycaprolactam, which is about the calculated equilibrium moisture content for this formulation, as shown in the table hereinabove. Furthermore, from the table it can be seen that by following a conventional procedure it takes 16 hours for polycaprolactam to be moisture conditioned to an equilibrium moisture content at 50% R.H.

Another nylon bar was conditioned in the same manner but to 25% relative humidity by substituting steam at 144° C.

Example 2

A polycaprolactam bar ⅛″ thick, made according to Formulation B above, is heated in boiling water for two hours, or 12% of the time necessary to reach equilibrium, and subsequently placed in a chamber containing steam at 120° C. (50% R.H.) and at atmospheric pressure for two hours, or 12% of the time necessary to reach equilibrium. The polycaprolactam sample was removed. This formulation of polycaprolactam is found to contain about moved. This formulation of polycaprolactam is found to contain about 2.4 grams of water per 100 grams of polycaprolactam, which is about the calculated equilibrium moisture content for this formulation as shown in the table hereinabove. Furthermore, from the table it can be seen that by following applicant's procedure the time of treatment is reduced from 2.65 hours to 1 hour.

Example 4

A polycaprolactam foamed bar ¼″ thick, made according to formulation C-2 above, is heated in boiling water for 1 hour, or 16% of the time necessary to reach equilibrium, and subsequently placed in a chamber containing steam at 120° C. (50% R.H.) and at atmospheric pressure for 1 hour, or 16% of the time necessary to reach equilibrium. The polycaprolactam sample was removed. This formulation of polycaprolactam is found to contain about 2.6 grams of water per 100 grams of polycaprolactam, which is about the calculated equilibrium moisture content for this formulation, as shown in the table hereinabove. Furthermore, from the table it can be seen that applicant's process reduced the time of treatment from 6.25 hours to 2 hours.

I claim:

1. A process for conditioning polycarbonamide to approximate equilibrium moisture content at a predetermined relative humidity which comprises contacting said polycarbonamide with $H_2O$ at about 100° C. for about 5 to 25% of the time necessary to reach equilibrium moisture content at about 100° C. and, subsequently contacting said polycarbonamide with atmospheric steam, at a temperature at which said steam at atmospheric pressure will give a predetermined relative humidity, for about 5 to 25% of the time necessary to reach equilibrium moisture content at such temperature.

2. The process of claim 1 wherein the polycarbonamide is contacted with $H_2O$ for about 10 to 15% of the time necessary to reach equilibrium moisture content.

3. A process for conditioning polycaprolactam to approximate equilibrium moisture content at a predetermined relative humidity which comprises contacting said polycaprolactam with $H_2O$ at about 100° C. for about 5 to 25% of the time necessary to reach equilibrium moisture content at about 100° C. and, subsequently contacting said polycaprolactam with atmospheric steam, at a temperature at which said steam at atmospheric pressure will give a predetermined relative humidity, for about 5 to 25% of the time necessary to reach equilibrium moisture content at such temperature.

4. The process of claim 3 wherein the polycaprolactam is contacted with $H_2O$ for about 10 to 15% of the time necessary to reach equilibrium moisture content.

5. The process of claim 3 wherein the temperature of the steam is 120° C.

References Cited

UNITED STATES PATENTS

| | | | |
|---|---|---|---|
| 2,157,117 | 5/1939 | Miles | 260—78 |
| 2,216,735 | 10/1940 | Carothers | 260—78 |
| 2,226,529 | 12/1940 | Austin | 260—78 |
| 2,251,962 | 8/1941 | Sommaripa | 260—78 |
| 2,298,868 | 10/1942 | Catlin | 260—78 |

HAROLD D. ANDERSON, *Primary Examiner.*

U.S. Cl. X.R.

8—149.1; 260—2.5, 96